July 9, 1957

W. B. McLEAN 2,798,995

ELECTRIC MOTOR

Filed Jan. 21, 1955

INVENTOR.
WILLIAM B. MC LEAN
BY
ATTORNEYS

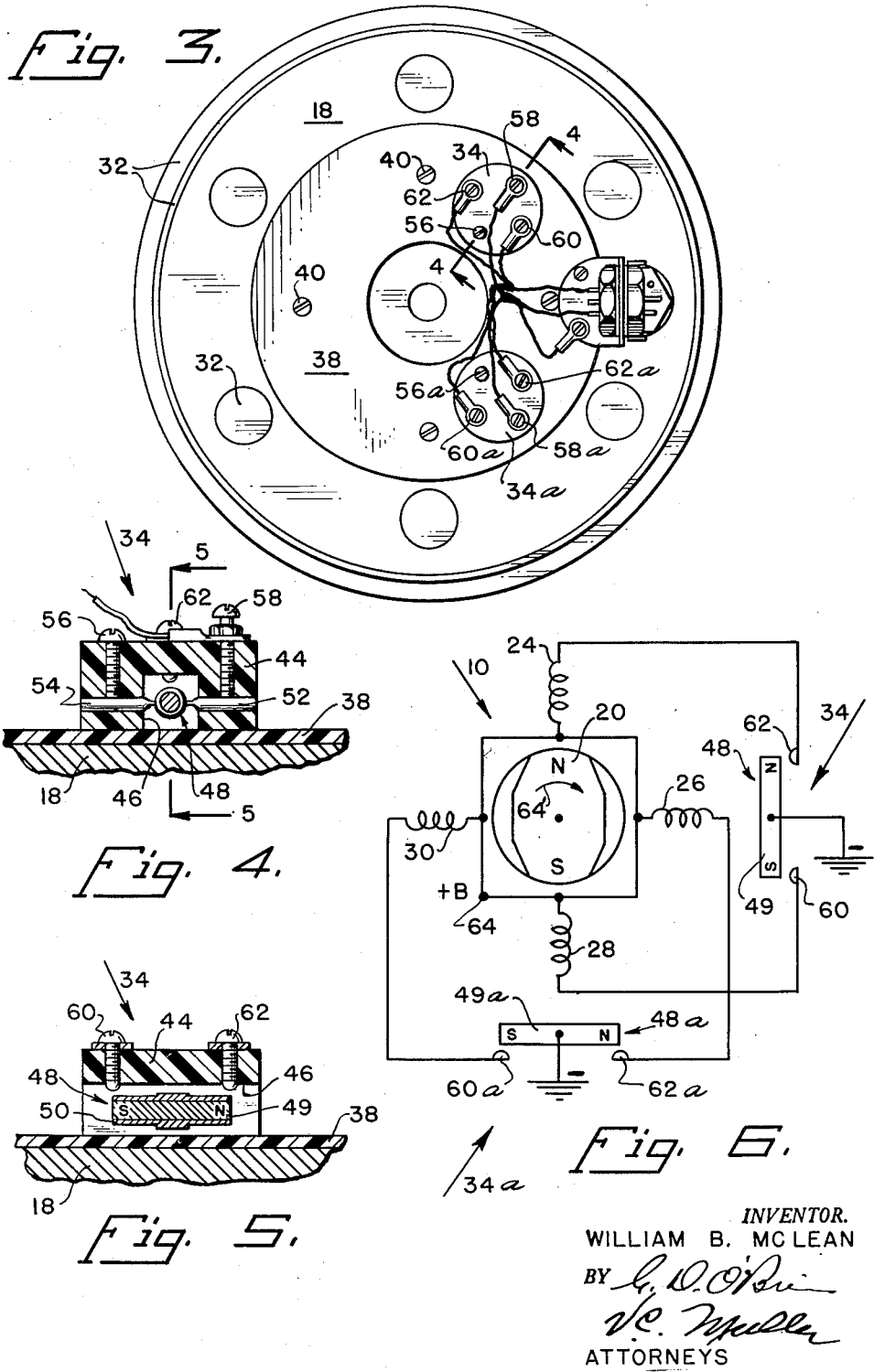

United States Patent Office 2,798,995
Patented July 9, 1957

2,798,995

ELECTRIC MOTOR

William B. McLean, China Lake, Calif., assignor to the United States of America as represented by the Secretary of the Navy Application January 21, 1955, Serial No. 483,451

5 Claims. (Cl. 318—254)

(Granted under Title 35, U. S. Code (1952), sec. 266)

The invention described herein may be manufactured and used by or for the Government of the United States of America for governmental purposes without the payment of any royalties thereon or therefor.

This invention relates to electric motors, and in particular to an electric motor which has a permanently magnetized rotor.

The motor of this invention is particularly adapted to drive the rotor of a gyro stabilized telescope of a target seeker. In my copending application No. 377,899, filed February 19, 1953, and entitled Target Seeking Gyroscope, there is disclosed one form of such a gyro stabilized telescope which has a permanent magnet mounted on the rotor of the gyroscope. Interaction between the magnetic field of the permanent magnet and the magnet field of a periodically energized circumferential coil is used to control precession of the rotor of the gyroscope.

In the motor constituting this invention, the permanently magnetized rotor is driven by the interaction between the magnetic field of its permanent magnet and magnetic fields induced in sequentially energized coils which are circumferentially located about the rotor. The energization of these coils is controlled by two single pole double throw switches each of which has a permanently magnetized armature actuated by the magnetic field of the permanent magnet of the gyro rotor.

It is, therefore, an object of this invention to provide an improved motor for driving the rotor of a gyroscope.

It is a further object of this invention to provide a simple self starting motor for a gyroscope which has a permanently magnetized rotor.

It is still a further object of this invention to provide a simple self starting motor for a gyroscope which will drive the rotor in a predetermined direction.

Another object of this invention is to provide a self starting motor for the rotor of a gyroscope which exerts substantially no restraining torques on the rotor.

Other objects and many of the attendant advantages of this invention will be readily appreciated as the same become better understood by reference to the following detailed description when considered in connection with the accompanying drawing wherein.

Figure 1:
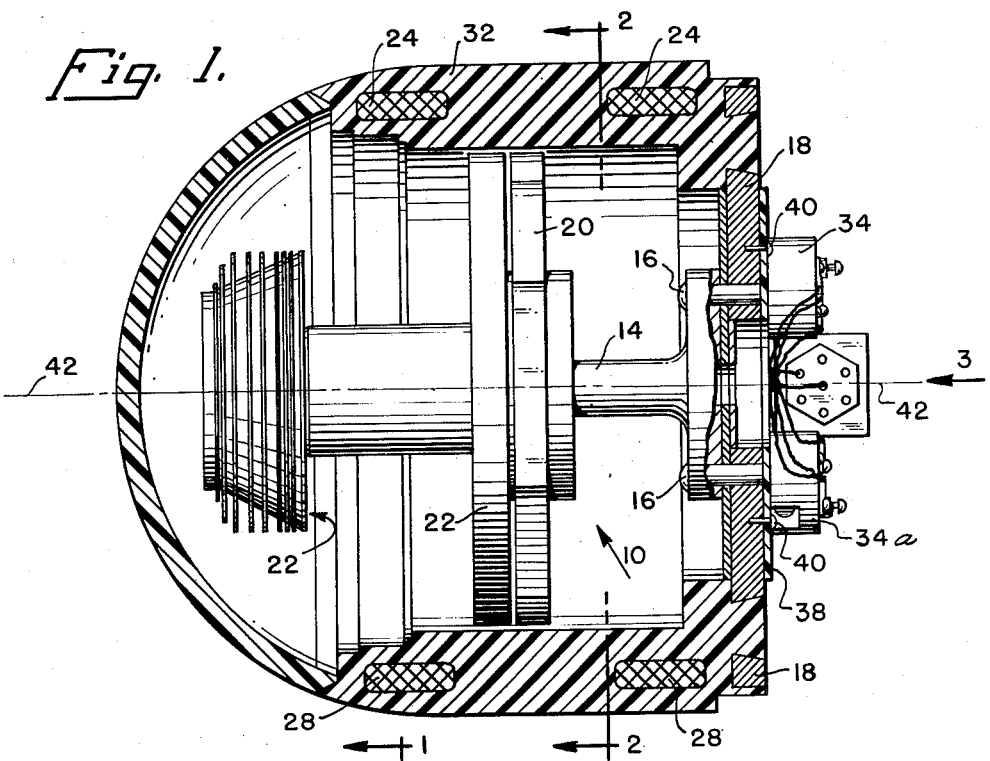
Fig. 1 is a section taken on line 1—1 of Fig. 2.

Fig. 3 is a side elevation taken in the direction of arrow 3 by the device illustrated in Fig. 1, Fig. 4 is an enlarged partial section taken on lines 4—4 of Fig. 3, Fig. 5 is a section taken on lines 5—5 of Fig. 4, and Fig. 6 is a schematic diagram for illustrating the theory of operation of the motor.

Figure 2:
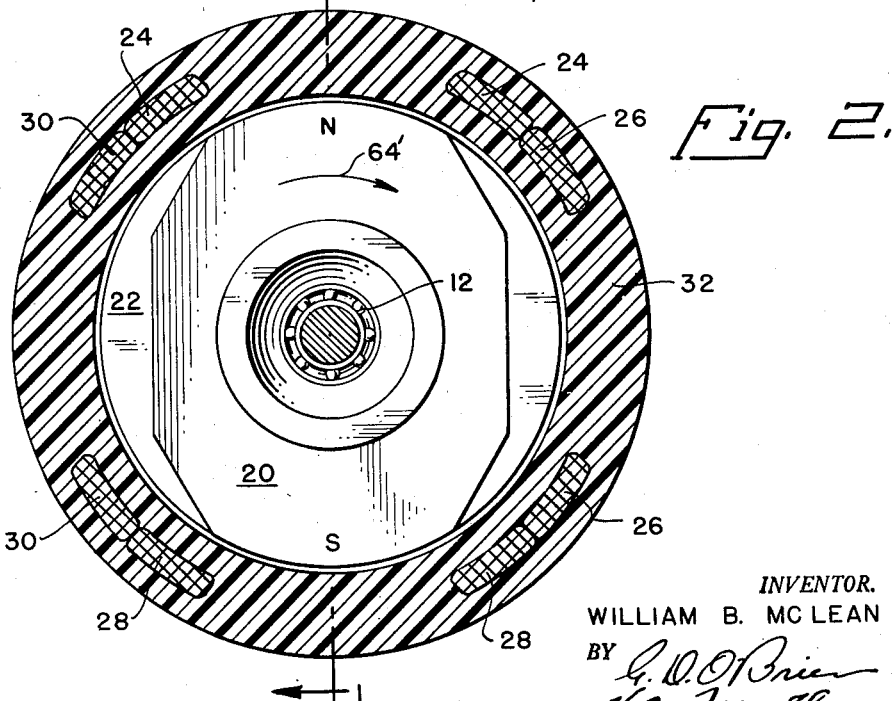
Fig. 2 is a section taken on line 2—2 of Fig. 1.

Referring now to the drawing, wherein like reference characters designate like or corresponding parts throughout the several views, there is shown in Figs. 1 and 2 rotor 10 of a gyroscope which is mounted on a central universal ball bearing 12 so as to have two degrees of angular freedom in addition to being rotatable. Bearing 12 is mounted on post 14 which is secured by bolts 16 to base plate 18. Post 14, bolts 16, and plate 18 as well as the remainder of the metal parts illustrated (with later-mentioned exceptions) are made from suitable non-magnetic materials such as aluminum. Rotor 10 consists of a permanent magnet 20, made in a preferred example of "Alnico V," an alloy consisting of 8% aluminum, 14% nickel, 24% cobalt, 3% copper, and the remainder iron, and a modified Cassegrainian telescope reflector 22. The north and south poles of magnet 20 are located on a line which intersects the center of bearing 12 as seen in Fig. 2, and the poles are near the circumference of rotor 10. Motor drive coils 24, 26, 28, 30 are circumferentially disposed about magnet 20 and within a plastic housing 32 which is permanently secured to base plate 18. Coils 24, 26, 28, 30 are equal in size and in the number of turns comprising each coil. The motor drive coils are circumferentially and equiangularly spaced with respect to the center of bearing 12.

Magnetic switches 34, 34a, which are single pole double throw switches, are mounted on member 38 which in turn is secured to the outer side of base plate 18 by screws 40. Switches 34, 34a are, in a preferred example, cemented to member 38 and are so mounted on member 38 with respect to the longitudinal axis 42 of post 14 that lines through the center of the switches and axis 42 substantially determine a right angle. It should also be noted that the center of bearing 12 lies on axis 42 and that the switches 34, 34a lie in a plane which is parallel to the normal plane of rotation of rotor 10, or at right angles to axis 42.

Details of magnetic switch 34 are illustrated in Figs. 4 and 5. Cylindrical base 44 is made of a suitable insulating material such as plastic and has a slot 46 formed therein. The armature 48 of the switch comprises a permanent magnet 49 which is encased in tube 50 made of a nonmagnetic conductor such as brass. Armature 48 is pivotally mounted within slot 46. The bearings for armature 48 consists of two pins 52, 54 which are located in openings formed in base 44 and engage armature 48. Pins 52, 54 which are shown as substantially radial with respect to the axis 42 as well as to the axis of armature 48, are held in place by set screws 56, 58. Electrical contacts 60, 62 are also mounted in base 44 and extend into slot 46 so that tube 50 can contact one or the other of them. An electrical circuit extends from set screw 58, pin 52, to tube 50 of armature 48. Switch 34a is identical in construction with switch 34.

In order to explain the operation of the invention, attention is directed to the schematic diagram given in Fig. 6. When rotor 10 is just past the relative position illustrated in Fig. 6, switch 34 is closer to the north pole of the magnet 20 of rotor 10 than to its south pole. The south pole of magnet 49 of switch 34 is attracted to the north pole of magnet 20 which pivots armature 48 so that armature 48 engages contact 62. A D. C. circuit thus exists from terminal 64, which is adapted to be connected to a suitable source of D. C. potential, through coil 24, contact 62, and armature 48 to ground. Coil 24 is wound and connected in the circuit so that direct current flowing from terminal 64 to ground creates a magnetic field that repels the north pole of magnet 20 and attracts its south pole.

At the same time, switch 34a is closer to the south pole of magnet 20 so that the north pole of magnet 49a is attracted toward the south pole of magnet 20. Armature 48a is pivoted so that it engages contact 60a, and a D. C. circuit exists from terminal 64 through coil 30, contact 60a and armature 48a to ground. Coil 30 is wound and connected in the circuit so that when a direct current flows through coil 30 from terminal 64 to ground a magnetic field is established which attracts the south pole of magnet 20 and repels the north pole. As a result, a torque is developed which tends to rotate rotor 10 in the direction indicated by arrow 64' in Fig. 6.

When rotor 10 has turned slightly more than 90° from its initial position as seen in Fig. 6 and in the direction of arrow 64', there is no change in the position of armature 48 of switch 34. Coil 24 remains energized and the magnetic field produced by the direct current in coil 24 continues to repel the north pole and attract the south pole of magnet 20. However, the north pole of magnet 20 is now nearer to switch 34a than its south pole, so that the south pole of magnet 49a is attracted to the north pole of magnet 20, causing armature 48a to engage contact 62a. A D. C. circuit then exists from terminal 64 to ground through coil 26. Coil 26 is wound and connected in the circuit so that when direct current flows from terminal 64 through it to ground, the north pole of magnet 20 will be repelled.

When rotor 10 has turned through an angle slightly greater than 180° from the position illustrated in Fig. 6, the south pole of magnet 20 will be nearer switch 34 than the north pole of magnet 20. The north pole of magnet 49 will be attracted to the south pole of magnet 20 causing armature 48 to pivot and engage contact 60. Thus coil 28 is energized with current flowing from terminal 64 through coil 28 to ground. Coil 28 is wound and connected in the circuit so that the magnetic field it produces when energized as described repels the north pole of magnet 20. There is no change in the position of armature 48a so that coil 26 remains energized.

When rotor 10 has turned through an angle slightly greater than 270° from the position illustrated in Fig. 6, there is no change in the position of switch 34 so that coil 28 remains energized. However, the south pole of magnet 20 is now nearer to magnet 49a of switch 34a than the north pole of magnet 20. Switch 34a has changed position so that a circuit exists from terminal 64 through coil 30 to ground. Coil 30 is wound and connected in the circuit so that when direct current flows from terminal 64 to ground through coil 30, a magnetic field is produced which repels the north pole of magnet 20.

From the foregoing it can be seen that the four motor drive coils 24, 26, 28, 30 are in effect successively energized, at least one coil being energized at any instant, and two adjacent coils being energized except for the short period of time when one of the switches is changing position. Because of the arrangement of switches 34, 34a, one or the other changes position every time rotor 10 turns through 90°. Member 38 carrying the switches is oriented with respect to the motor drive coils to obtain the proper phase relationship between the current flow through the motor drive coils and the position of rotor 10 in order for the motor to operate most efficiently.

Rotor is provided in actual practice with caging means, which are not illustrated, so that its axis of rotation initially is substantially coincident with axis 42. Irrespective of the initial position of rotor 10, one or the other of the magnetic switches 34, 34a will be closer to one of the poles of magnet 20 than the other so that an electrical circuit will exist through at least one of the motor drive coils whenever a suitable source of D. C. potential is applied to terminal 64; thus the motor is self starting. By the proper arrangement of the switches and coils, the motor can be arranged to drive the rotor in a predetermined direction.

The motor constituting this invention can be used in several different ways. In one example, it is used merely to start the rotor and see that it initially is turning in a given direction and thereafter the rotor may be driven by other means. In another example, the electric motor constituting this invention is used to bring the rotor up to maximum speed and then is stopped with the rotor thereafter being allowed to coast. Also, the motor can be used to continuously drive the rotor. The maximum angular velocity of the rotor is determined by the inertia of the armature 48. The maximum angular velocity can be selected to correspond to the velocity it is desired to rotate the rotor of the gyroscope. Rotor 10 will normally not be precessed as much as 20° from its initial position after being uncaged. When the motor is used to drive the rotor after it has been uncaged, this small angle of precession will not adversely affect the operation of the rotor nor will it cause the motor to develop excessive restraining torques which would cause the rotor to precess in an undesirable manner.

Obviously many modifications and variations of the present invention are possible in the light of the above teachings. It is, therefore, to be understood that within the scope of the appended claims the invention may be practiced otherwise than as specifically described.

What is claimed is:

1. A motor comprising a bar-type magnetized armature symmetrically journalled for rotation about an axis perpendicular to the longitudinal axis of said magnet, a set of four stator coils positioned circumferentially and symmetrically about said axis of rotation and adapted, when energized by a D. C. source, to produce torque action upon said armature about said axis of rotation, a pair of double-throw switches adapted and positioned to operate in quadrature sequence and to each provide a complete cycle of switch operation by magnetic influence of said armature during a complete revolution thereof, and circuit means establishing connections between the switches and stator coils and for sequential energization of said coils by said switch operation and D. C. source to provide continuous rotation of the armature about said axis of rotation.

2. A gyroscopic apparatus comprising, in combination, a rotor mounted for continuous angular displacement about an axis of rotation, said rotor including a bar-type magnetized armature mounted symmetrically thereon with its longitudinal axis perpendicular to said axis of rotation, a set of four stator coils positioned circumferentially and symmetrically about said axis of rotation and adapted, when energized by a D. C. source, to produce torque action upon said armature and rotor about said axis of rotation, a pair of double-throw switches adapted and positioned to operate in quadrature sequence and to each provide a complete cycle of switch operation by magnetic influence of said armature during a complete revolution thereof, and circuit means establishing connections between the switches and stator coils and for sequential energization of said coils by said switch operation and D. C. source to provide continuous rotation of the armature and rotor about said axis of rotation.

3. A gyroscopic apparatus comprising, in combination, a rotor mounted for continuous angular displacement about an axis of rotation which is itself pivoted for two degrees of precessional freedom with limited angular displacement about a center lying on said axis, said rotor including a bar-type magnetized armature mounted symmetrically thereon with its longitudinal axis perpendicular to said axis of rotation, a set of four stator coils positioned circumferentially and symmetrically about a normal position of said axis of rotation and adapted, when energized by a D. C. source, to produce torque action upon said armature and rotor about said axis of rotation, a pair of double-throw switches adapted and positioned to operate in quadrature sequence and to each provide a complete cycle of switch operation by magnetic influence of said armature during a complete revolution thereof, and circuit means establishing connections between the switches and stator coils and for sequential energization of said coils by said switch operation and D. C. source to provide continuous rotation of the armature and rotor about said axis of rotation.

4. A motor comprising an armature having two poles and symmetrically journaled to define a motor drive axis, four drive coils spaced substantially uniformly about said axis, a pair of double-throw switches positioned at substantially uniform distance from said axis and in a plane substantially perpendicular to said axis, said switches operating by magnetic influence of said armature to provide, during a complete revolution of said armature, a complete cycle of double-throw switch action, said switches being further positioned in quadrature relationship about said axis whereby to operate in quadrature sequence, and circuit means connecting said drive coils to a D. C. source through said switches for sequential energization of said drive coils such that, initially, two adjacent drive coils are energized to exert a starting torque of predetermined direction upon said armature to impart rotation thereto about said axis, and thereafter the four drive coils are energized in a continuing sequence during rotation of said armature to maintain rotation in said predetermined direction.

5. A gyroscope motor comprising an armature having two poles and symmetrically journaled to define a motor drive axis which is subject to limited angular displacement relative to a center lying on said axis, four drive coils spaced substantially uniformly about a normal position of said axis, a pair of double-throw switches positioned at uniform distance from, and in a plane substantially perpendicular to, the normal position of said axis, said switches operating by magnetic influence of said armature to provide, during a complete revolution of said armature, a complete cycle of double-throw switch action, said switches being further positioned in quadrature relationship about said axis whereby to operate in quadrature sequence, and circuit means connecting said drive coils to said switches for sequential energization of said drive coils such that, initially, two adjacent drive coils are energized to exert a starting torque of predetermined direction upon said armature to impart rotation thereto about said axis, and thereafter the four drive coils are energized in a continuing sequence during rotation of said armature to maintain rotation in said predetermined direction.

References Cited in the file of this patent
UNITED STATES PATENTS

| | | |
|---|---|---|
| 2,538,216 | Stehlik | Jan. 16, 1951 |
| 2,558,540 | Clos | June 26, 1951 |